May 14, 1940.  E. H. HAMMOND  2,201,039
TEMPERATURE RESPONSIVE INSTRUMENT
Filed Nov. 7, 1938
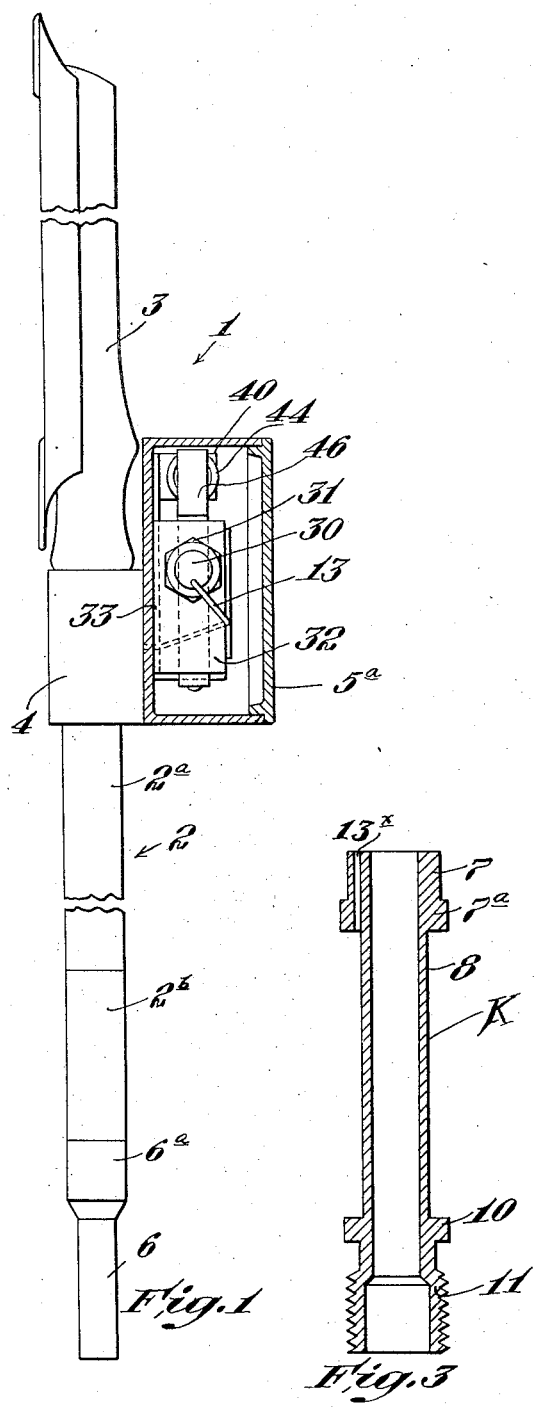
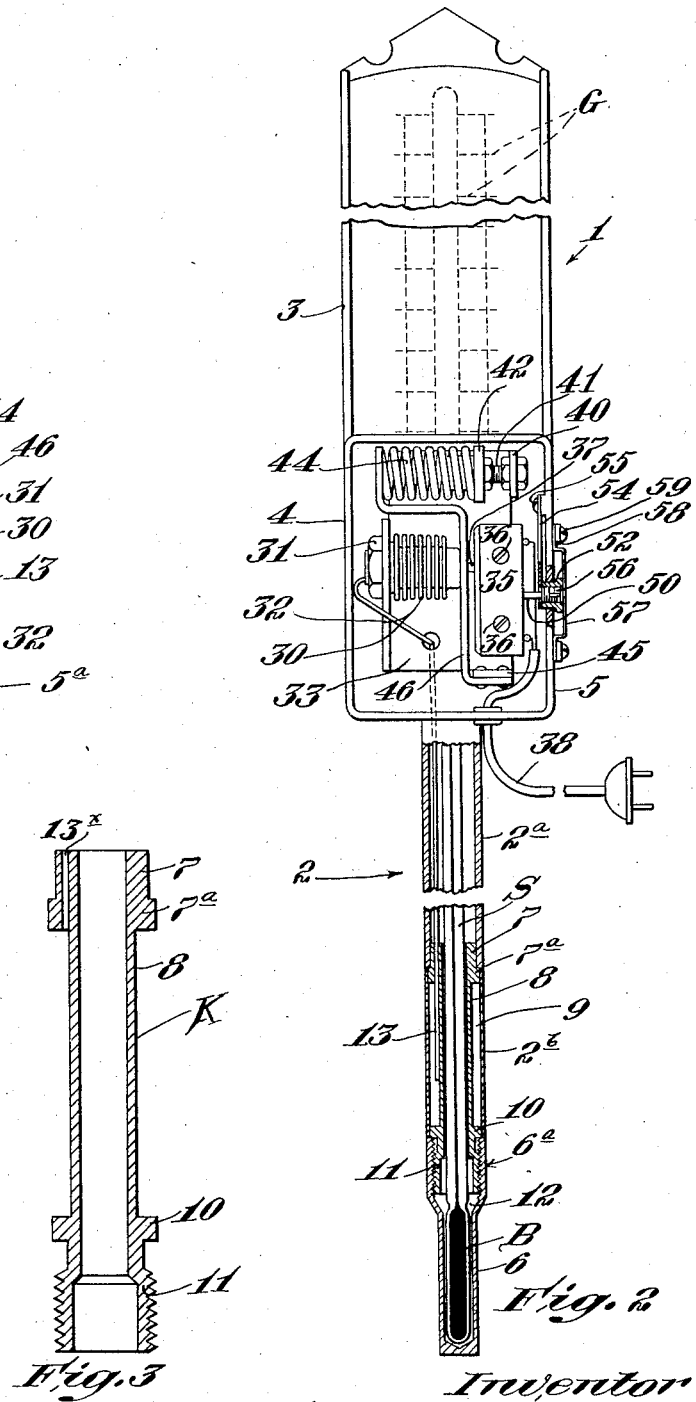
Inventor
Elmer H. Hammond
by Roberts Cushman & Woodberry
attys.

Patented May 14, 1940

2,201,039

UNITED STATES PATENT OFFICE 2,201,039

TEMPERATURE RESPONSIVE INSTRUMENT

Elmer H. Hammond, Southport, Conn., assignor to Manning, Maxwell & Moore, Incorporated, New York, N. Y., a corporation of New Jersey Application November 7, 1938, Serial No. 239,289

10 Claims. (Cl. 200—140)

This invention pertains to temperature-responsive instruments useful, for example, in the pasteurization of milk, fruit juices or the like, and which combines in a single portable appliance motor means and indicating means both responsive to variations in temperature.

Among the objects of the invention are to provide an instrument including such motor and indicating means and which is convenient to use and easy to keep clean; which is of simple but sturdy construction and capable of withstanding the shocks, sudden temperature changes, etc. ordinarily to be expected during use and without impairment of accuracy or substantial danger of injury or breakage; which makes use of an ordinary unmodified fluid-in-glass thermometer for indicating temperatures but in which such thermometer is so embodied as to permit its removal or replacement without affecting the other parts of the instrument; in which the heat-sensitive elements of both motor device and indicating means, while independent, are so associated as to receive substantially the same amount of heat energy from a surrounding medium; in which the motor means is powerful enough to actuate a part, for example, an electrical switch, without recourse to the use of a relay or equivalent device; and wherein the motor means may readily be adjusted so as to respond to different temperatures.

In most states the law requires that in pasteurizing milk a mercury-in-glass thermometer be used for visually indicating the milk temperature, and also that some means such as a recording thermometer be provided for recording the milk temperature and the length of the pasteurizing period. Furthermore, it is often desirable, even when not legally requisite, to provide some kind of thermally responsive motor means (thermostat) operative when the milk reaches a predetermined temperature so as automatically to operate some device, for instance an electrical switch, thereby to actuate an alarm or to cut off the source of pasteurizing heat.

In order to meet these several requirements it has heretofore been proposed to arrange the several thermally responsive units in different ways. For example, it has been proposed to use a motor device or thermostat, an indicating device, and a recording device, each of the several devices having an independent thermally-sensitive element. It has also been proposed to build the switch actuating motor or thermostat into the case of the recorder and to actuate it from the thermally-responsive element of the recorder. It has further been proposed to modify the usual mercury-in-glass thermometer by introducing contacts into the capillary canal in the thermometer stem and designed to be engaged by the mercury column in the thermometer and thereby to close a controlling circuit through the motor means.

To provide an entirely separate instrument for performing each of the desired operations, to wit, for indicating the temperature, for recording the temperature and for actuating the control switch or the like, requires three separate inlets into the pasteurizing vat and their removal for sterilization after each operation, since in most places the law requires that all equipment in contact with the milk must be sterilized after each use. Moreover, the use of three separate instrumentalities complicates the proper mounting of the several devices in the pasteurizing apparatus.

The second of the above-suggested arrangements is undesirable for the reason that the usual recording instrument is of more or less standard construction and the association of a thermostat or motor means with the recorder necessitates the building of a recorder of special type which is necessarily expensive. Furthermore, the recorder itself is usually a complicated instrument of delicate construction and the addition of the motor means or thermostat complicates servicing of the recorder and, if the thermostat fails to operate, makes it necessary to return the entire instrument to the factory for repair.

The proposal to introduce contacts into the stem of the mercury-in-glass thermometer so that the mercury may complete a switch circuit also has disadvantages. For instance, a slight separation of the mercury thread such as sometimes takes place accidentally will make the thermostat inoperative; the contacts must necessarily be very small and thus have a low current-carrying capacity, so that a relay must be employed; the introduction of the contacts into the glass thermometer stem requires care and is expensive and, if the thermometer be broken, necessitates its replacement by an expensive part and the connection of the contacts to the leads extending to the switch circuit, and since the upper contact must be located in the thermometer tube in the region where the reading of the thermometer takes place, the fusing of the contacts into the glass tends to change the optical properties of the glass and thus to make it difficult to read the height of the mercury column easily and accurately.

In accordance with the present invention, the difficulties commonly encountered in previous arrangements have been substantially eliminated, for in accordance with the present invention the motor device or thermostat and the indicating device are combined in a satisfactory way in a single instrument wherein an ordinary mercury-in-glass or other fluid-in-glass thermometer is used as the indicating instrument. This thermometer is readily removed and replaced without at all disturbing the other parts of the apparatus. Furthermore, a powerful, sturdy and reliable motor, adapted to operate a circuit-closing switch for current of substantial amount, is provided, so that relays or similar apparatus are not necessary; the thermally-sensitive elements of the thermometer and the switch-actuating motor are closely associated so as to be subject to substantially the same temperature and are both housed in a single strong and durable case which is easily cleaned; since the thermally-sensitive elements of both motor device and indicating device are housed in the same casing, but one opening into the pasteurizing apparatus is requisite for accommodating the indicating and motor means; provision is also made whereby the switch-operating means may be adjusted to respond to different operating temperatures.

Further objects and advantages of the present invention will be hereinafter more fully set forth and described by reference to the accompanying drawing in which:

Fig. 1 is a side elevation, with certain parts shown in section, of an instrument embodying the present invention;

Fig. 2 is a rear elevation, with certain parts removed and certain parts in section, illustrating the instrument of Fig. 1; and Fig. 3 is a longitudinal section, to large scale, illustrating one of the parts of the apparatus.

Referring to the drawing, wherein there is illustrated what is now considered to be the preferred form of the invention, the numeral 1 designates the instrument as a whole. As shown, this instrument comprises an elongate tubular case 2 comprising an upper part $2^a$ and a lower part $2^b$. This case preferably is of generally cylindrical shape and of a material which is a good conductor of heat but which is acceptable for immersion in the fluid under treatment and which has a smooth readily cleanable exterior surface. Polished metal will ordinarily be employed by reason of its strength and cheapness, but it is contemplated that other substances, for example, synthetic resin of suitable character may be used in making the parts forming this tubular case, as well as other parts of the instrument, if desired.

At its upper part the case 2 merges with a vertically elongate frame 3 open at its front (except that it may be closed by a glass or other transparent cover plate if desired) and which provides a protecting housing for the upper end of the stem of the thermometer. The front or exposed face of the rear wall of this frame may itself be provided with graduations G, or may constitute a backing or support for a piece of sheet material, for example, Celluloid, brass or the like, bearing the graduations G, the latter being designed to cooperate with the fluid column in the thermometer stem to indicate the temperature to which the thermometer bulb is exposed.

Just below the junction of the case 2 and the frame 3 the case is embraced by a sleeve or clamping device 4, fixed to or integral with the box-like motor casing 5. This motor casing may be of metal, synthetic resin or other suitable material which is rigid, easily formed to the desired shape, and which may readily be cleaned and is not injured by contact with the substances to which the instrument may be exposed in use, and preferably is provided with a removable cover $5^a$ giving access to its interior.

The lower end of the cylindrical case 2 preferably is formed by a removable hollow cap 6, the upper part $6^a$ of which is of an external diameter substantially equal to that of the body of the case 2, but the lower end of which is preferably of somewhat less diameter. However, the interior of the cap 6 is sufficiently large to accommodate the bulb B of the thermometer, the stem S of which extends upwardly along the cylindrical case 2 and into the interior of the frame 3, the upper part of the stem being exposed to view and cooperatively related to the graduation G.

Within the lower part $2^a$ of the case 2 there is arranged an elongate more or less spool-shaped member K (Fig. 3) whose upper head comprises the cylindrical annular plug 7 which fits snugly within the lower end of the upper member $2^a$ of the case. This upper head also comprises the radial flange portion $7^a$ of an external diameter such as to fit snugly within the upper end of the member $2^b$ of the case 2, it being noted that the member $2^b$ of the case 2, while of the same external diameter as the member $2^a$, is of thinner material than the latter. The elongate spool-like member K also comprises the tubular cylindrical barrel portion 8 which constitutes a cylindrical septum or partition defining the inner wall of an annular chamber 9 (Fig. 2) whose outer wall is formed by the member $2^b$ of the case. The lower head of this spool-like member K comprises the flange 10 which fits snugly within the lower end of the case member $2^b$. Below this flange the lower head comprises the externally screw-threaded portion 11 which is engaged by internal screw threads in the upper part $6^a$ of the cap 6. The spool-like member K is permanently united to the parts $2^a$ and $2^b$, so as to provide a leakproof joint, for example, by a driving fit between the parts, or by solder or brazing. The annular pressure chamber 9 is thus completely cut off from the remainder of the space within the casing 2 and from the space 12 within the cap 6 in which the thermometer bulb is housed, while the interior of the spool-like member provides a guiding passage and sleeve-like support for the stem of the thermometer, and from which such stem may readily be withdrawn upon removal of cap 6.

From the chamber 9 a capillary canal, which is conveniently provided by a small tube 13 of copper or the like, extends up, leak-tight, through a passage $13^x$ in the upper head of the spool-like member and longitudinally through the upper part $2^a$ of the casing 2, and thence into the housing 5 in which the motor device is located. This capillary canal thus provides communication between the pressure chamber 9 and the motor device so that thermally-expansible pressure fluid contained within the chamber 9 may react upon the motor parts.

The housing 5 provides a compartment within which is disposed a motor device having an expansible-contractible chamber provided with a movable wall. As shown, this chamber is provided by a bellows 30, one end of which is rigidly secured by a nut 31 to an outwardly projecting bracket 32 integral with a plate 33 which is firmly attached in any suitable manner to the rear wall of the housing 5. This fixed end of the bellows is provided with an opening through which the upper end of the tube 13 projects, the connection thus provided being such as to provide leak-tight communication between the annular chamber 9 and the interior of the bellows 30. Although the motor device comprising the bellows may be used to operate various types of control instrumentalities, for instance a recording thermometer or the like, it is here specifically shown as being operatively associated with a snap-acting electric switch 35 secured to the plate 33 by screws 36 and positioned so that its actuating pin or lever 37 is directly opposite the inner end of the bellows.

The switch 35 preferably is a type which requires but a small movement of and/or slight pressure on the pin or lever 37 to cause it to act, and is provided with leads 38 which connect the switch to a source of power and to some mechanism or system which may, for example, control the power input to the processing apparatus with which the control unit is associated. Since this type of switch is of well known construction and as the controlled mechanism may be of conventional design and construction, a further description is unnecessary.

The upper edge of the plate 33 is shaped to provide an outstanding bracket 40 having a threaded opening to receive an adjusting screw 41 carrying a flanged stud 42 which supports and centers a coil spring 44. The lower edge of the plate 33 is shaped to provide an outstanding bracket 45 to which is secured the lower end of a leaf spring 46. The spring 46 extends upwardly between the inner or movable end of the bellows 30 and the pin 37 and then laterally above the bellows, terminating in an upwardly projecting free end which engages the outer end of the coil spring 44. The construction and arrangement of parts preferably is such that the spring 46 normally contacts the end of the bellows 30 and actuating pin 37, and the spring 44 is adjusted so that it normally acts upon the end of the leaf spring 46 yieldingly to resist expanding movement of the bellows.

Although the switch 35 may be provided with automatic resetting mechanism or yieldable means normally maintaining it in closed position, for some installations it is desirable that the control switch be of a manually resetting type, so that when the circuit is broken it cannot be reestablished until the switch has been manually closed by an attendant or operator in charge. As here shown by way of illustration, the switch 35 is provided with a reset pin 50 which extends outwardly toward an opening in the side wall of the housing. An interiorly threaded bushing 52 has a sliding fit within this opening and its inner end is attached to or engageable with the free end of a leaf spring 54, the upper end of which is anchored to the housing by a screw 55. An adjusting screw 56 is so disposed within the bushing 52 that its inner end is engageable with the reset pin 50. A circular metal diaphragm 57, positioned against the outer face of the housing so as to surround the opening therein, is held in place by a ring 58 and screw 59. The parts are so adjusted that the spring 54 normally holds the bushing 52 outwardly against the diaphragm 57 with the adjusting screw 56 contacting the end of the reset pin 50 so that pressure applied to the diaphragm forces the bushing 52 and adjusting screw 56 inwardly against the action of the spring 54 and operates the reset pin 50. When the pressure is released, the spring 54 returns the bushing and associated parts to normal position, thus leaving the switch free for the next operation.

Before completing the assembly operation, the annular chamber 9, capillary tube 13 and bellows 30 are first evacuated and partially filled with a suitable volatile liquid, and after completion of the assembly operation, the device may be calibrated by adjusting the spring 44 so that the expansion of the bellows 30 will operate the switch 35 at the proper temperature. The housing 5 preferably is provided with a moisture-proof cover or other suitable closure 5ª which, if desired, may be sealed in place to prevent unauthorized tampering with the parts.

In using an instrument constructed in accordance with the present invention, the case 2 may be inserted into a vat or other processing apparatus through a suitable opening so that, if desired, the chambers 9 and 12 are immersed in the material under treatment. Within a short time the mercury thermometer registers the prevailing temperature, and as the temperature within the vat increases, there is a corresponding increase in the vapor pressure within the system consisting of the annular chamber 9, the tube 13 and bellows 30. When the temperature increases to a point corresponding to the predetermined setting, the pressure within the system is sufficient to operate the bellows which, in turn, effects the operation of the switch 35. As above noted, the switch 35 may constitute a part of a mere alarm system, or it may automatically control the processing operation, for example, by cutting off or decreasing the power input to avoid overheating the material under treatment. Where, as here shown, the switch is of the manual reset type, it must be reset by an attendant before the control device can be again operated, but if the switch be of the automatic resetting type, it will reset itself when the temperature drops.

The control device herein shown is particularly suitable for use in pasteurizing operations, since the elongate case 2 may be immersed in the milk or cream under treatment and the temperature conditions are not only indicated at all times by the mercury thermometer, but, if desired, the bellows may be used automatically to operate a recording thermometer, in addition to instrumentalities controlling the heat input to the pasteurizer. After each pasteurizing operation the control device may be quickly removed and those portions of the instrument which have been exposed within the pasteurizing vat may be easily cleaned and sterilized.

While I have shown and described one desirable embodiment of the invention, it is to be understood that the present disclosure is for the purpose of illustration and that various changes in shape, proportion, and arrangement of parts, as well as the substitution of equivalent elements for those herein shown and described, may be made without departing from the spirit and scope of the invention as set forth in the appended claims.

I claim:

1. A control device for a pasteurizer, comprising an elongate fluid-tight tubular casing having a smooth, easily cleanable, exterior surface, and means for supporting the casing from its upper part in depending relation within the pasteurizer, partition means within the casing defining two independent closely adjacent chambers in the lower end portion of the casing, each chamber being designed to receive a thermally expansible element, one of said chambers being substantially cylindrical and the other being substantially annular in horizontal section and having a tubular inner wall which provides a fluid-tight passage through said annular chamber, and means defining independent canals leading from the respective chambers to the upper end of the casing, the canal from the cylindrical chamber extending through the passage provided by the tubular inner wall of the annular chamber.

2. A control device for a pasteurizer, comprising an elongate fluid-tight tubular casing having a smooth, easily cleanable, exterior surface, and means for supporting the casing from its upper part in depending relation within the pasteurizer, the casing having a chamber within its lower end for the reception of a thermally expansible element, and a spool-like member disposed within the casing immediately above said chamber, said spool-like member having a barrel portion and spaced upper and lower heads which fit snugly and leak-tight within the casing, the barrel portion having an axial bore defining a passage leading upwardly from the space at the lower end of the casing, the annular space defined by the barrel, the heads and the wall of the casing being designed for the reception of a thermally expansible element, the upper head having an opening therethrough and a tube secured leak-tight in said opening and leading from the annular chamber upwardly within the casing.

3. A control device of the kind which includes thermally actuated control means comprising a pressure operated motor and a support therefor and visually observable thermometric means for checking the accuracy of the control means characterized in having an elongate fluid-tight casing which depends from the motor support and which is designed to be positioned within a processing apparatus, the casing having a smooth, easily cleanable exterior surface and having therein partition means defining two closely adjacent chambers, one housing a thermally sensitive fluid which expands rapidly in response to temperature change and the other housing a volatile fluid whose vapor pressure varies with temperature change, a canal leading from each of said chambers longitudinally of and within the casing, that one of said canals which communicates with the first-named chamber comprising a portion having transparent walls through which the thermally expansible fluid is visually observable thereby to constitute the visually observable thermometric means, and the other of said canals leading to the motor.

4. Pasteurizing apparatus of the kind in which a thermally responsive control device is associated with a fluid-in-glass thermometer for checking the accuracy of the control device, said apparatus comprising a support for the control device and an elongate fluid-tight casing which depends from the support and which is designed to be introduced through an opening into the pasteurizing receptacle and to have its lower portion immersed in the liquid undergoing pasteurization, the casing comprising two closely adjacent coaxial chambers designed respectively to hold the bulb of the thermometer and a body of volatile liquid, the casing having a longitudinal passage leading from one of said chambers for the accommodation of the thermometer stem, and a conduit leading longitudinally of the casing from the other chamber to the control device.

5. A control device of the kind which includes thermally actuated control means, comprising a pressure-operated motor and a support therefor, and a fluid-in-glass thermometer for checking the accuracy of the control means, characterized in having an elongate fluid-tight casing which depends from the motor support and which is designed to be positioned within the processing apparatus, the casing having a smooth, easily cleanable, exterior surface, and having a removable cap at its lower end providing a chamber in which the bulb of the thermometer is housed, the thermometer being removable from the case by disconnecting the cap, a septum within the case defining a chamber wholly separate from the space within the cap, thermally sensitive, motor-actuating, pressure fluid disposed within said latter chamber, and means providing a canal extending from said chamber to the motor.

6. A control device of the kind which includes thermally actuated control means, comprising a pressure-operated motor and a support therefor, and a fluid-in-glass thermometer for checking the accuracy of the control means, characterized in having an elongate fluid-tight casing which depends from the motor support and which is designed to be positioned within the processing apparatus, the casing having a smooth easily cleanable, exterior surface, and being of strong rigid material capable of withstanding the effects of fluid at elevated temperatures, the casing having a removable cap at its lower end which forms the bottom and side walls of a space in which the bulb of the thermometer is housed, the stem of the thermometer extending longitudinally of the casing with that portion of the stem which is remote from the bulb exposed to view, the thermometer being freely removable from the casing when the cap is removed, means providing a chamber within the casing adjacent to the thermometer bulb but wholly separate from the chamber in which the latter is housed, and means providing a canal leading from said latter chamber to the motor.

7. A control device of the kind which includes thermally actuated control means, comprising a pressure-operated motor and a support therefor, and a fluid-in-glass thermometer for checking the accuracy of the control means, characterized in having an elongate fluid-tight casing which depends from the motor support and which is designed to be positioned within the processing apparatus, the casing having a smooth, easily cleanable, exterior surface, and having at its lower end a bulb chamber adapted to receive the bulb of the thermometer with its stem extending longitudinally within the casing, means defining an annular pressure chamber substantially coaxial with the bulb chamber, a volatile fluid within said annular chamber, and a conduit leading from said pressure chamber to the pressure-operated motor whereby the motor responds to pressure changes within said pressure chamber.

8. A control device of the kind which includes thermally actuated control means, comprising a pressure-operated motor and a support therefor, and a fluid-in-glass thermometer for checking the accuracy of the control means, characterized in having an elongate tubular member depending from the motor support and adapted to be positioned within the processing apparatus or immersed in material therein, said tubular member having a smooth, continuous, outer surface free from irregularities and having a removable lower end, said lower end defining a chamber adapted to receive the bulb of the thermometer, the lower part at least of the thermometer stem being within and extending longitudinally of the casing, the casing having an annular chamber substantially coaxial with and disposed in close proximity to the bulb-receiving chamber, the inner wall of said annular chamber defining a passageway through which the stem of the thermometer extends, the annular chamber containing a volatile fluid, and a conduit connecting said annular chamber with the pressure-operated motor.

9. A control device comprising a housing, a temperature control mechanism within said housing, and an elongate tubular member depending from said housing and adapted to be positioned within a processing apparatus or immersed in material therein, said tubular member having a removable lower end of reduced cross-sectional area providing a chamber adapted to receive a heat-sensitive element constituting a part of a temperature indicating device, an annular chamber juxtaposed above said removable lower end and in substantially coaxial relation with the first-mentioned chamber, the said annular chamber containing a heat-sensitive element, and a connection between said control mechanism and said annular chamber effective to cause the actuation of said control mechanism in response to temperature conditions within said annular chamber.

10. Pasteurizing apparatus of the kind in which a thermally responsive control device is associated with a fluid-in-glass thermometer for checking the accuracy of the control device, said apparatus comprising a support for the control device and an elongate fluid-tight casing which depends from the support and which is designed to be introduced through an opening into the pasteurizing receptacle and to have its lower portion immersed in the substance undergoing pasteurization, the casing having therein a chamber designed to hold a body of volatile fluid and a conduit leading from said chamber to the control device, the casing having therein a second chamber closely adjacent to the first, designed to house the bulb of the thermometer, the first-named chamber having extending therethrough a fluid-tight passage designed to accommodate the thermometer stem.

ELMER H. HAMMOND.